US010422249B2

(12) United States Patent
Takeda et al.

(10) Patent No.: US 10,422,249 B2
(45) Date of Patent: Sep. 24, 2019

(54) EXHAUST FRAME

(71) Applicant: Mitsubishi Hitachi Power Systems, Ltd., Nishi-ku, Yokohama (JP)

(72) Inventors: Takuya Takeda, Yokohama (JP); Tetsuya Nakamura, Yokohama (JP); Ryo Kawai, Yokohama (JP); Kenji Nanataki, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 0 days.

(21) Appl. No.: 15/408,805

(22) Filed: Jan. 18, 2017

(65) Prior Publication Data
US 2017/0211424 A1     Jul. 27, 2017

(30) Foreign Application Priority Data

Jan. 22, 2016   (JP) .................................. 2016-011010

(51) Int. Cl.
*F01D 25/30*      (2006.01)
*F01D 25/14*      (2006.01)
*F01D 9/06*       (2006.01)
*F02C 7/18*       (2006.01)
(Continued)

(52) U.S. Cl.
CPC ............. *F01D 25/30* (2013.01); *F01D 9/065* (2013.01); *F01D 25/12* (2013.01); *F01D 25/14* (2013.01);
(Continued)

(58) Field of Classification Search
CPC ........ F01D 25/30; F01D 25/12; F01D 25/243; F01D 25/26; F01D 25/14; F01D 25/24;
(Continued)

(56) References Cited

U.S. PATENT DOCUMENTS 3,631,672 A * 1/1972 Gentile ................... F01D 25/30
                                                    415/116
6,638,013 B2 * 10/2003 Nguyen .................. F01D 9/065
                                                    415/115
(Continued)

FOREIGN PATENT DOCUMENTS

EP       2 578 816 A2    4/2013
JP     2005-83199 A      3/2005
(Continued)

OTHER PUBLICATIONS

Extended European Search Report issued in counterpart European Application No. 17152469.7 dated Jun. 12, 2017 (9 pages).

*Primary Examiner* — Alain Chau
(74) *Attorney, Agent, or Firm* — Crowell & Moring LLP (57) ABSTRACT

An exhaust frame includes: an inner casing; an inner diffuser which defines, between the inner diffuser and the inner casing, an annular inner cooling passage connected to a final-stage wheel space; an outer diffuser which defines an exhaust passage between the outer diffuser and the inner diffuser; an outer casing which defines an annular outer cooling passage between the outer casing and the outer diffuser; a strut which connects the inner casing and the outer casing to each other while crossing the exhaust passage; a strut cover which connects the inner diffuser and the outer diffuser to each other, and defines, between the strut cover and the strut, an annular connection passage connecting the inner cooling passage and the outer cooling passage to each other; and a communication hole provided in a wall of the outer cooling passage at a position on the downstream side of a center line of the strut in the flow direction of a combustion gas.

4 Claims, 8 Drawing Sheets

(51) Int. Cl.
　　　*F01D 25/12*　　(2006.01)
　　　*F01D 25/26*　　(2006.01)
(52) U.S. Cl.
　　　CPC ............... *F01D 25/26* (2013.01); *F02C 7/18*
　　　　　(2013.01); *F05D 2260/20* (2013.01); *F05D*
　　　　　*2260/941* (2013.01); *Y02T 50/675* (2013.01)
(58) Field of Classification Search
　　　CPC ...... F01D 9/065; F01D 25/03; F05D 2260/20;
　　　　　　　F05D 2260/941; F02C 7/12; F02C 7/18;
　　　　　　　　　　　　　　　　　Y02T 50/675
　　　See application file for complete search history.

(56) References Cited

U.S. PATENT DOCUMENTS

| | | | | |
|---|---|---|---|---|
| 7,373,773 | B2* | 5/2008 | Noda | F01D 5/081 |
| | | | | 60/266 |
| 8,740,550 | B2* | 6/2014 | Tanioka | F01D 5/081 |
| | | | | 415/116 |
| 8,756,911 | B1* | 6/2014 | Liang | F01D 25/12 |
| | | | | 415/116 |
| 9,109,510 | B2* | 8/2015 | Hashimoto | F02C 7/28 |
| 2003/0161718 | A1 | 8/2003 | Nguyen et al. | |
| 2005/0050898 | A1 | 3/2005 | Noda | |
| 2007/0089421 | A1* | 4/2007 | Jangili | F01D 25/12 |
| | | | | 60/772 |
| 2013/0084172 | A1* | 4/2013 | Kasibhotla | F01D 25/125 |
| | | | | 415/182.1 |
| 2014/0123659 | A1* | 5/2014 | Biyani | F01D 25/14 |
| | | | | 60/772 |
| 2014/0286763 | A1* | 9/2014 | Munshi | F02C 7/12 |
| | | | | 415/178 |
| 2017/0241295 | A1* | 8/2017 | Konishi | F01D 25/24 |

FOREIGN PATENT DOCUMENTS

| | | |
|---|---|---|
| WO | WO 2014/105492 A1 | 7/2014 |
| WO | WO 2014105492 A1 * | 7/2014 ............ F01D 25/12 |

* cited by examiner

EXHAUST FRAME

BACKGROUND OF THE INVENTION

1. Field of the Invention

The present invention relates to an exhaust frame for a gas turbine.

2. Description of the Related Art

In recent years, for enhancing the efficiency of a gas turbine, there has been a demand for a rising combustion temperature. A rise in the combustion temperature of a gas turbine is accompanied by a rise in the temperature of the exhaust gas from the turbine, and, as a result, the temperature of the exhaust frame into which the exhaust gas flows can also be raised. Therefore, it is necessary to efficiently cool the exhaust frame, for securing maintainability of the exhaust frame.

As a method for cooling the exhaust frame, there is a method in which cooling air supplied into the exhaust frame via a cooling air supply hole is led to a final stage wheel space of the turbine by way of inter-strut spaces each of which is defined between a strut and a strut cover (see, for example, JP-2005-83199-A).

SUMMARY OF THE INVENTION

The inter-strut space is defined in a tubular shape such as to cover the strut which extends across the combustion gas passage at a position on the downstream side as compared to the cooling air supply hole and the final stage wheel space in the flow direction of the combustion gas. Therefore, as compared to the flow path length in the case of flowing by way of that portion of the inter-strut space which is the nearest to the cooling air supply hole (this portion will hereinafter be referred to as the near-side space), the flow path length in the case of flowing by way of that portion of the inter-strut space which is the farthest from the cooling air supply hole (this portion will hereinafter be referred to as the far-side space) is longer. In general, the pressure loss of cooling air which flows through a passage or flow path is smaller as the flow path length is shorter. In the case where the supply pressure of the cooling air is constant, the flow rate of the cooling air is increased as the pressure loss is reduced. In JP-2005-83199-A, therefore, the flow rate of the cooling air flowing via the near-side space is increased, whereas the flow rate of the cooling air flowing via the far-side space is decreased.

When the flow rate of the cooling air flowing by way of the far-side space is decreased, the cooling air becomes liable to stagnate in the passage in the vicinity of the inlet of the far-side space. In this case, the cooling efficiency for the exhaust frame may be lowered in the vicinity of the inlet of the far-side space.

The present invention has been devised in view of the above and an object of the present invention is to restrain the cooling efficiency for an exhaust frame from being lowered.

In order to achieve the object, the present invention provides an exhaust frame connected to an outlet for a combustion gas of a turbine, the exhaust frame including: an inner casing; an inner diffuser which covers an outer side of the inner casing and which defines, between the inner diffuser and the inner casing, an annular inner cooling passage connected to a final-stage wheel space of the turbine; an outer diffuser which covers an outer side of the inner diffuser and which defines an exhaust passage for the combustion gas between the outer diffuser and the inner diffuser; an outer casing which covers an outer side of the outer diffuser and which defines an annular outer cooling passage between the outer casing and the outer diffuser; a strut which connects the inner casing and the outer casing to each other while crossing the exhaust passage; a strut cover which connects the inner diffuser and the outer diffuser to each other, covers the strut, and which defines, between the strut cover and the strut, an annular connection passage connecting the inner cooling passage and the outer cooling passage to each other; and a communication hole provided in a wall of the outer cooling passage at a position on a downstream side of a center line of the strut in a flow direction of the combustion gas.

According to the present invention, it is possible to restrain the cooling efficiency for an exhaust frame from being lowered.

DESCRIPTION OF THE PREFERRED EMBODIMENTS

<First Embodiment>
(Configuration)
1. Gas Turbine

Figure 1:
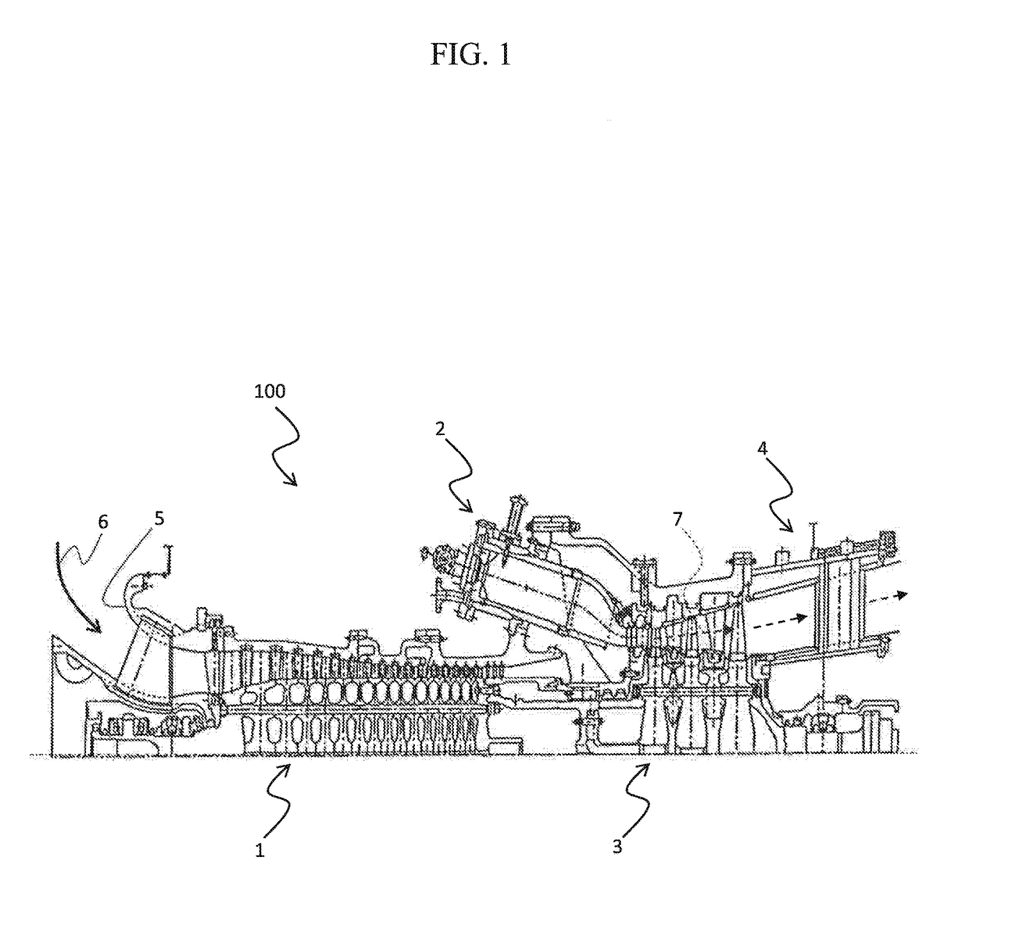
FIG. 1 illustrates a configuration example of a gas turbine provided with an exhaust frame according to a first embodiment of the present invention.

FIG. 1 illustrates a configuration example of a gas turbine provided with an exhaust frame according to a first embodiment. The exhaust frame according to this embodiment is applied, for example, to a heavy structure type gas turbine that is disposed on the ground and used mainly for power generation.

As shown in FIG. 1, the gas turbine 100 includes a compressor 1, a combustor 2, a turbine 3 and an exhaust frame 4. In this embodiment, the compressor 1 and the turbine 3 are connected to each other through a shaft (not shown). The compressor 1, which is rotationally driven by the turbine 3, compresses air 6 sucked in through a suction part 5 to generate high-pressure air (combustion air), and supplies the high-pressure air to the combustor 2. The combustor 2 mixes the high-pressure air supplied from the compressor 1 with a fuel supplied from a fuel system (not shown), burns a resultant mixture to generate a high-temperature combustion gas 7, and supplies the combustion gas 7 to the turbine 3. The turbine 3 is rotationally driven through expansion of the combustion gas 7 supplied from the combustor 2. The turbine 3 or the compressor 1 is connected with a load apparatus (not shown). In this embodiment, a generator is connected to the turbine 3 as a load apparatus, and motive power obtained by subtracting motive power for driving the compressor 1 from rotational power of the turbine 3 is converted into electric power by the generator. The combustion gas 7 having driven the turbine 3 flows into the exhaust frame 4 as a turbine exhaust gas, and is released to the atmospheric air via the exhaust frame 4 and an exhaust duct (not shown).

2. Exhaust Frame

The exhaust frame 4 is provided on the downstream side of the turbine 3 with respect to the flow direction of the combustion gas 7, and connects an outlet for a combustion gas 7 of the turbine 3 and the exhaust duct to each other. The upstream and downstream with respect to the flow direction of the combustion gas 7 will hereinafter referred to simply as "upstream" and "downstream," respectively.

Figure 2:
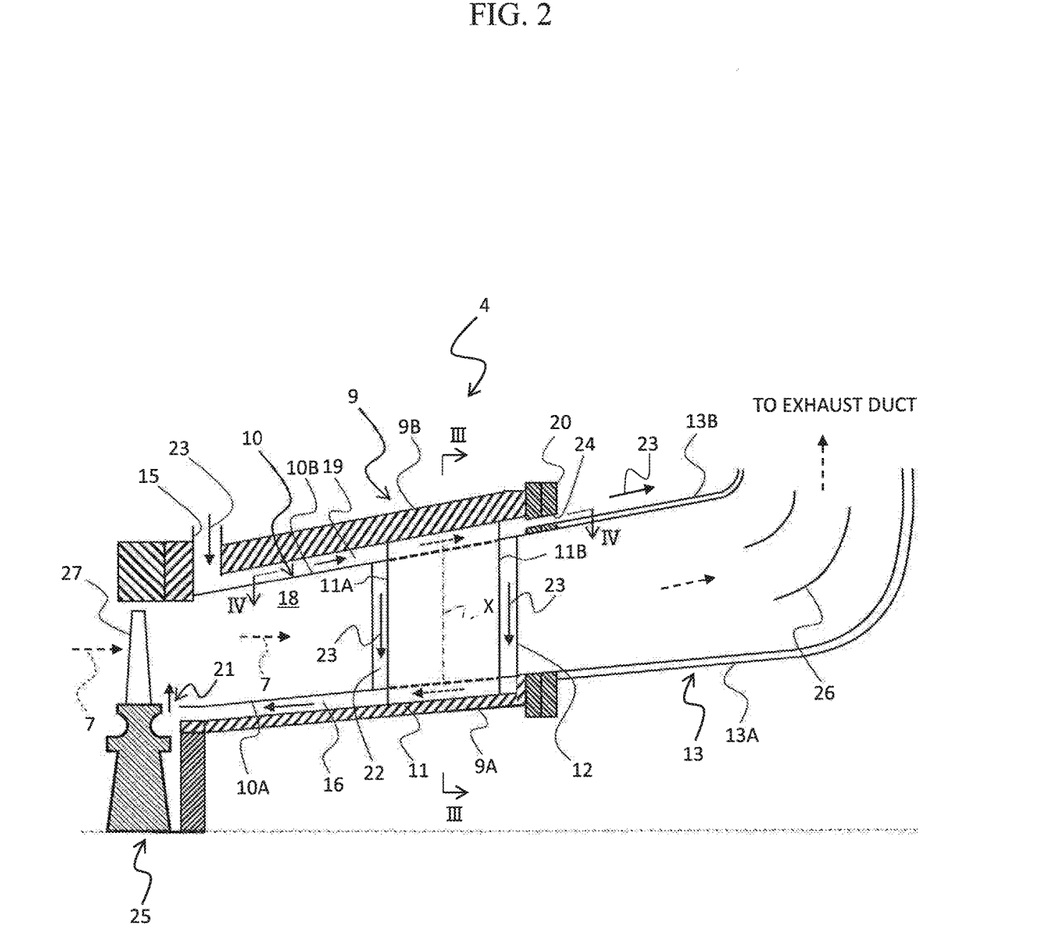
FIG. 2 is a schematic configuration view of the exhaust frame according to the first embodiment of the present invention.
Figure 3:
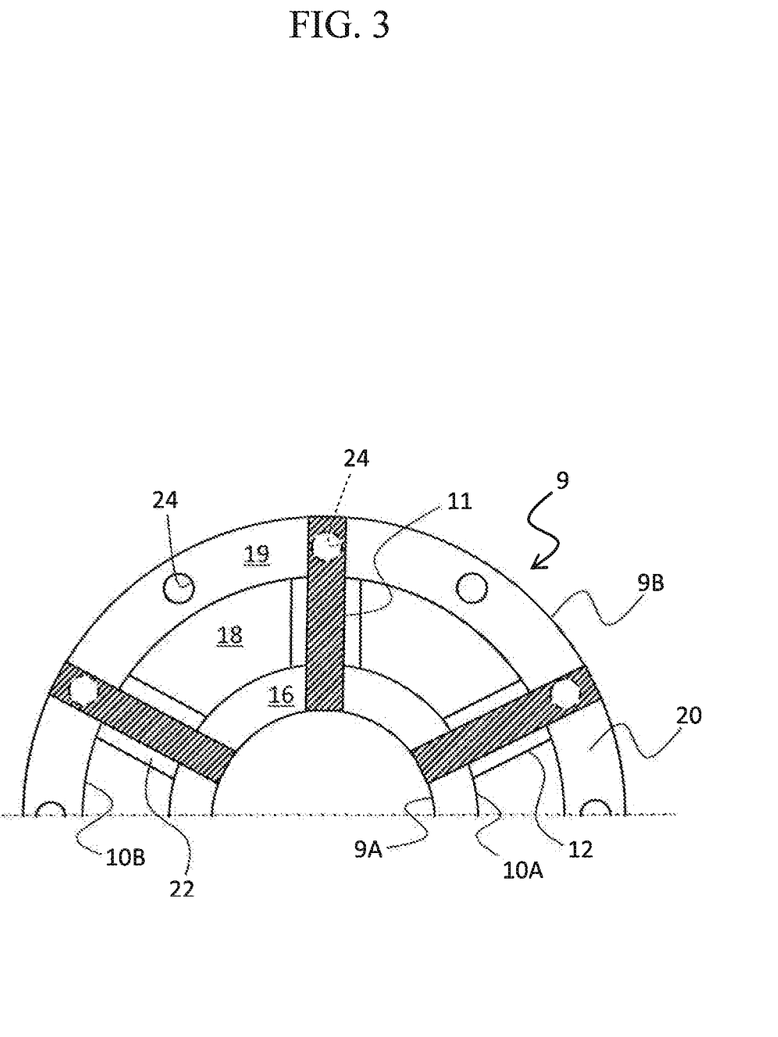
FIG. 3 is a sectional view in an arrow direction taken along line III-III of FIG. 2.

FIG. 2 is a schematic configuration view of the exhaust frame according to this embodiment, and FIG. 3 is a sectional view in an arrow direction taken along line III-III of FIG. 2. As illustrated in FIG. 2, the exhaust frame 4 according to this embodiment includes a casing 9, an upstream-side diffuser 10, strut 11, strut cover 12, a downstream-side diffuser 13 and communication holes 24.

The casing 9 constitutes a part of a circumferential wall of the exhaust frame 4. The casing 9 includes an inner casing 9A and an outer casing 9B, with an annular space defined inside thereof. The upstream-side diffuser 10 is accommodated in the casing 9. The upstream-side diffuser 10 includes an inner diffuser 10A and an outer diffuser 10B.

The inner casing 9A is a conical surface-shaped member which constitutes an inner circumferential wall of the casing 9.

The inner diffuser 10A is a conical surface-shaped member formed such as to cover the outer side of the inner casing 9A, and constitutes an inner circumferential wall of the upstream-side diffuser 10. On the upstream side of the inner casing 9A and the inner diffuser 10A, there is provided a final stage wheel 25 which includes final stage moving blades 27 of the turbine 3. The inner casing 9A and the inner diffuser 10A are spaced downstream from the final stage wheel 25 such as to secure a space (final stage wheel space) 21 between their upstream-side end portions and the final stage wheel 25. An annular space defined between the inner diffuser 10A and the inner casing 9A constitutes a passage (inner cooling passage) 16 through which cooling air supplied into the exhaust frame 4 flows. The inner cooling passage 16 communicates with the final stage wheel space 21.

The outer diffuser 10B is a conical surface-shaped member formed such as to cover the outer side of the inner diffuser 10A, and constitutes an outer circumferential wall of the upstream-side diffuser 10. An annular space defined between the inner diffuser 10A and the outer diffuser 10B constitutes a passage (exhaust passage) 18 through which the combustion gas 7 from the turbine 3 flows.

The outer casing 9B is a conical surface-shaped member formed such as to cover the outer side of the outer diffuser 10B, and constitutes an outer circumferential wall of the casing 9. An annular space defined between the outer diffuser 10B and the outer casing 9B constitutes a passage (outer cooling passage) 19 through which cooling air supplied into the exhaust frame 4 flows. The outer cooling passage 19 is provided with a cooling medium supply hole 15. The cooling medium supply hole 15 is a cooling air introduction hole provided in the outer cooling passage 19 at a position on the upstream side of connection passages 22 (described later). In this embodiment, a portion of the high-pressure air generated by the compressor 1 (see FIG. 1) is extracted and is supplied through the cooling medium supply hole 15 into the exhaust frame 4 as cooling air 23.

The struts 11 are provided such as to cross the exhaust passage 18 at positions on the downstream side, in the inner diffuser 10A and the outer diffuser 10B, and connect the inner casing 9A and the outer casing 9B to each other. The outer casing 9B described above is supported by a turbine stand (not shown), and the struts 11 play the role of supporting the inner casing 9A relative to the outer casing 9B. The struts 11 are provided (in this embodiment, six) at regular intervals along the circumferential direction of the inner casing 9A. As shown in FIG. 3, in this embodiment, the struts 11 extend radially from the inner casing 9A in the radial directions of the casing 9 (in the directions from the inner casing 9A toward the outer casing 9B). It is to be noted, however, that the struts 11 may be provided to extend from the inner casing 9A in the state of being inclined in the circumferential direction in relation to the radial direction of the casing 9.

As shown in FIG. 2, the strut covers 12 connect the inner diffuser 10A and the outer diffuser 10B to each other, and are provided in such a manner that each strut cover 12 covers the outer side of the strut 11 as viewed in a section extending in the rotating direction (circumferential direction) of the turbine 3. Annular spaces each defined between the strut 11 and the strut cover 12 constitute passages (connection passages) 22 connecting the inner cooling passage 16 and the outer cooling passage 19 to each other.

The downstream-side diffuser 13 is connected to the downstream side of the upstream-side diffuser 10 through a flange 20. A downstream-side end portion of the outer cooling passage 19 is closed with the flange 20 for the outer diffuser 10B and the downstream-side diffuser 13 that are connected to each other. The downstream-side diffuser 13 includes an inner diffuser 13A and an outer diffuser 13B. The inner diffuser 13A and the outer diffuser 13B are members which are formed in a trumpet shape such that an annular space defined therebetween is turned toward a radially outer side on the downstream side. The inner diffuser 13A and the outer diffuser 13B respectively constitute an inner circumferential wall and an outer circumferential wall of the downstream-side diffuser 13. At least one turn vane (in this embodiment, two turn vanes) 26 is provided inside the downstream-side diffuser 13. Each of the turn vanes 26 is provided in such a manner that its ventral side surface (positive-pressure surface, that is a surface hollowed in a concaved shape) is oriented toward the outer diffuser 13B side whereas its back side surface (negative-pressure surface, that is a surface projected in a convexed shape) is oriented toward the inner diffuser 13A side.

The communication holes 24 are provided in a wall of the outer cooling passage 19 at positions on the downstream side of center lines X, which extend in the turbine radial directions, of the struts 11 in regard to the flow direction of the combustion gas 7. In this embodiment, the communication holes 24 are provided on the downstream side of downstream edges 11B of the struts 11; specifically, the communication holes 24 are provided in the flange 20 by which the outer diffuser 10B and the downstream-side diffuser 13 are coupled to each other. Through the communication holes 24, the outer cooling passage 19 communicates with a space outside the downstream-side diffuser 13, namely, with the outside of gas turbine fluid systems such as systems of a working fluid, cooling air, sealing air, etc. Note that it is important for the positions of the communication holes 24 to be located on the downstream side of the center lines X of the struts 11, and, where the communication holes 24 are disposed on the downstream side of the downstream edges 11B of the struts 11, stagnation regions (which will be detailed later) inside the cooling passage can be thereby reduced. Besides, as shown in FIG. 3, in this embodiment, a plurality of the communication holes 24 are provided at intervals along the circumferential direction. The circumferential pitch of the communication holes 24 is set to be shorter than the circumferential pitch of the struts 11 which cross the outer cooling passage 19, such that at least one communication hole 24 is disposed between each pair of the adjacent struts 11. In this embodiment, the communication holes 24 are each provided at each of the positions corresponding to the struts 11 and at each middle position between the adjacent struts 11, as viewed in the axial direction of the turbine. While one communication hole 24 is provided between the adjacent struts 11 in this embodiment, a plurality of the communication holes 24 may be provided between the adjacent struts 11. In this case, while the circumferential pitch of the communication holes 24 may be constant, the communication holes 24 may be unevenly distributed along the circumferential direction; for example, the communication holes 24 may be provided such that the circumferential density thereof is higher in the vicinity of the midpoint between the adjacent struts 11 and is lower in the vicinity of the struts 11. While the opening area of the communication hole 24 is constant in this embodiment, the opening area of the communication hole 24 may be set to vary along the circumferential direction. The total opening area of the communication holes 24 is set such that most of the cooling air 23 supplied into the exhaust frame 4 is intercepted by the flange 20, and the flow rate of the cooling air 23 flowing out through the communication holes 24 can be suppressed to such an extent that its influence on gas turbine efficiency is negligible (for example, around 3% based on the total flow rate of the cooling air 23). The communication holes 24 are formed in such a manner that they can be closed with plugs or the like, by forming the communication holes 24 as threaded holes, for example.

(Operation)

The flow of the cooling air 23 supplied to the exhaust frame 4 according to this embodiment will be described below.

The combustion gas 7 produced in the combustor 2 flows into the turbine 3 in the state of a higher pressure (e.g., about 2 MPa) as compared to the atmospheric pressure, is lowered in pressure and temperature while performing a work at each stage of the turbine 3, and passes through the final-stage moving blades 27 to flow into the exhaust passage 18 (see FIG. 2). The combustion gas 7 at the time of flowing into the exhaust passage 18 has a pressure (e.g., about 0.09 MPa) having been lowered below the atmospheric pressure. The combustion gas 7 having flowed into the exhaust passage 18 is reduced in velocity in the process of flowing downstream (toward the outlet side) through the exhaust passage 18, and recovers pressure nearly to the atmospheric pressure.

The cooling air 23 is an extracted portion of the high-pressure air produced in the compressor 1, and is supplied into the outer cooling passage 19 via the cooling medium supply hole 15 in the state of a high pressure (e.g., about 0.11 MPa). Since the combustion gas 7 flowing into the exhaust passage 18 has a pressure lower than the atmospheric pressure, the cooling air 23 supplied into the outer cooling passage 19 flows through the outer cooling passage 19, the connection passages 22 and the inner cooling passage 16 due to the pressure difference between its pressure and the internal pressure inside the exhaust passage 18, to join the combustion gas 7 flowing through the exhaust passage 18, by way of the final stage wheel space 21. In this way, the cooling air 23 flows along the casing 9, the upstream-side diffuser 10, the struts 11 and the strut covers 12 in a turning-back manner, whereby the casing 9, the upstream-side diffuser 10, the struts 11 and the strut covers 12 are effectively cooled. Note that an example wherein an extracted portion of the high-pressure air produced at the compressor 1 is used as the cooling air 23 has been described in this embodiment, this is not restrictive; for example, other supply source such as a blower can also be used.

(Effects)

Figure 5:
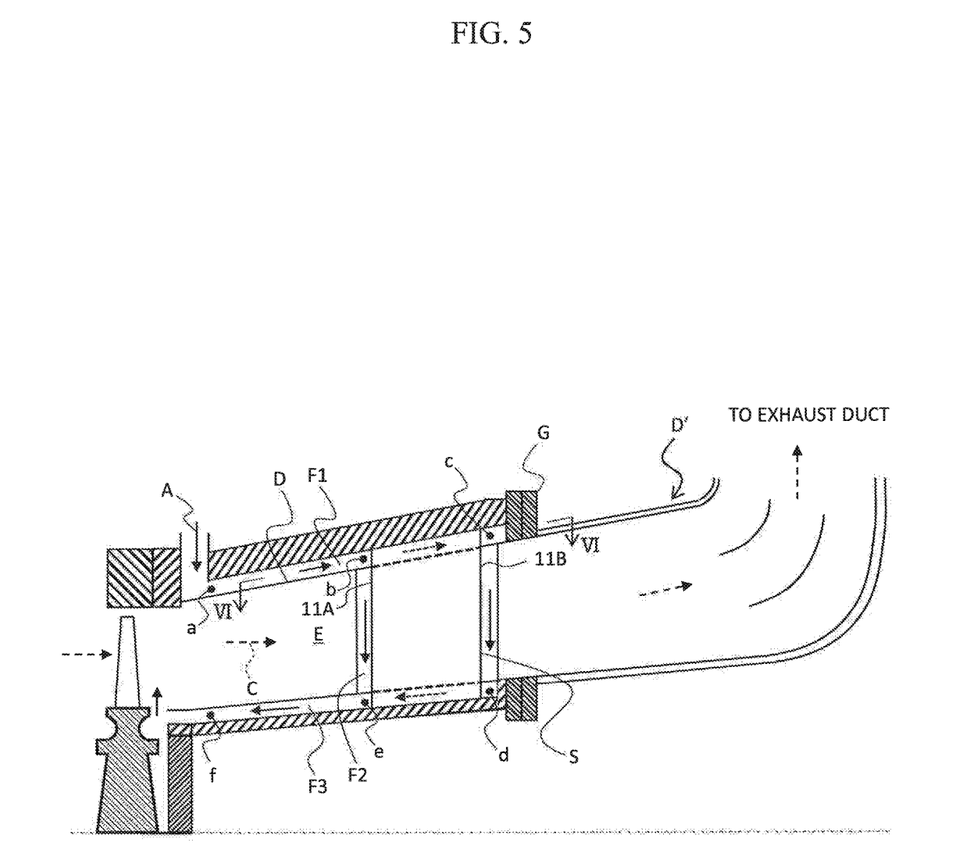
FIG. 5 is a schematic configuration view of an exhaust frame according to a comparative example.
Figure 6:
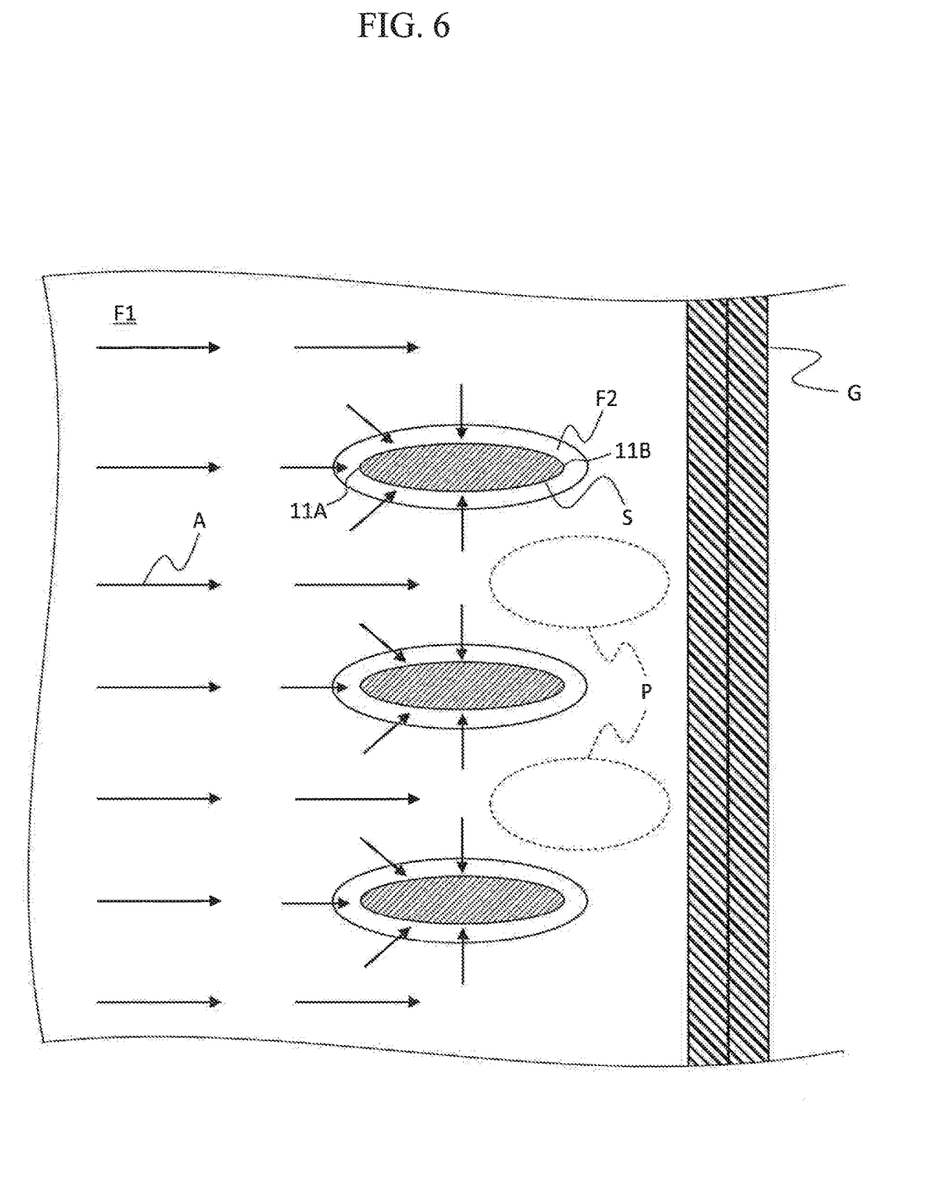
FIG. 6 is a sectional view in an arrow direction taken along line VI-VI of FIG. 5.

(1) FIG. 5 is a schematic configuration view of an exhaust frame according to a comparative example, and FIG. 6 is a sectional view in an arrow direction taken along line VI-VI of FIG. 5. In the exhaust frame according to the comparative example, cooling air A supplied into an outer cooling passage F1 flows from the outer cooling passage F1 into connection passages F2, flows through the connection passages F2 into an inner cooling passage F3, and flows through the inner cooling passage F3 into an exhaust passage E. Here, as compared with the flow path length of an inner going-around flow path of going on the side of an upstream edge 11A of a strut S in the connection passage F2 of an outer diffuser D (namely, a flow path of going through points a, b, e and f in FIG. 5), the flow path length of an outer going-around flow path of going on the side of a downstream edge 11B of the strut S in the connection passage F2 (namely, a flow path of going through points a, b, c, d, e and f in FIG. 5) is longer. Therefore, the flow rate of the cooling air A flowing along the outer going-around flow path is smaller than the flow rate of the cooling air A flowing along the inner going-around flow path. In other words, the flow velocity of the cooling air A flowing along the outer going-around flow path to the side of the downstream edges 11B of the struts S in the connection passages F2 is reduced. Consequently, as shown in FIG. 6, stagnation regions P of the cooling air A are generated in the vicinity of inlets of the connection passages F2 on the side of the downstream edges 11B between the adjacent struts S, and this can cause a lowering in the cooling efficiency for the exhaust frame.

Figure 4:
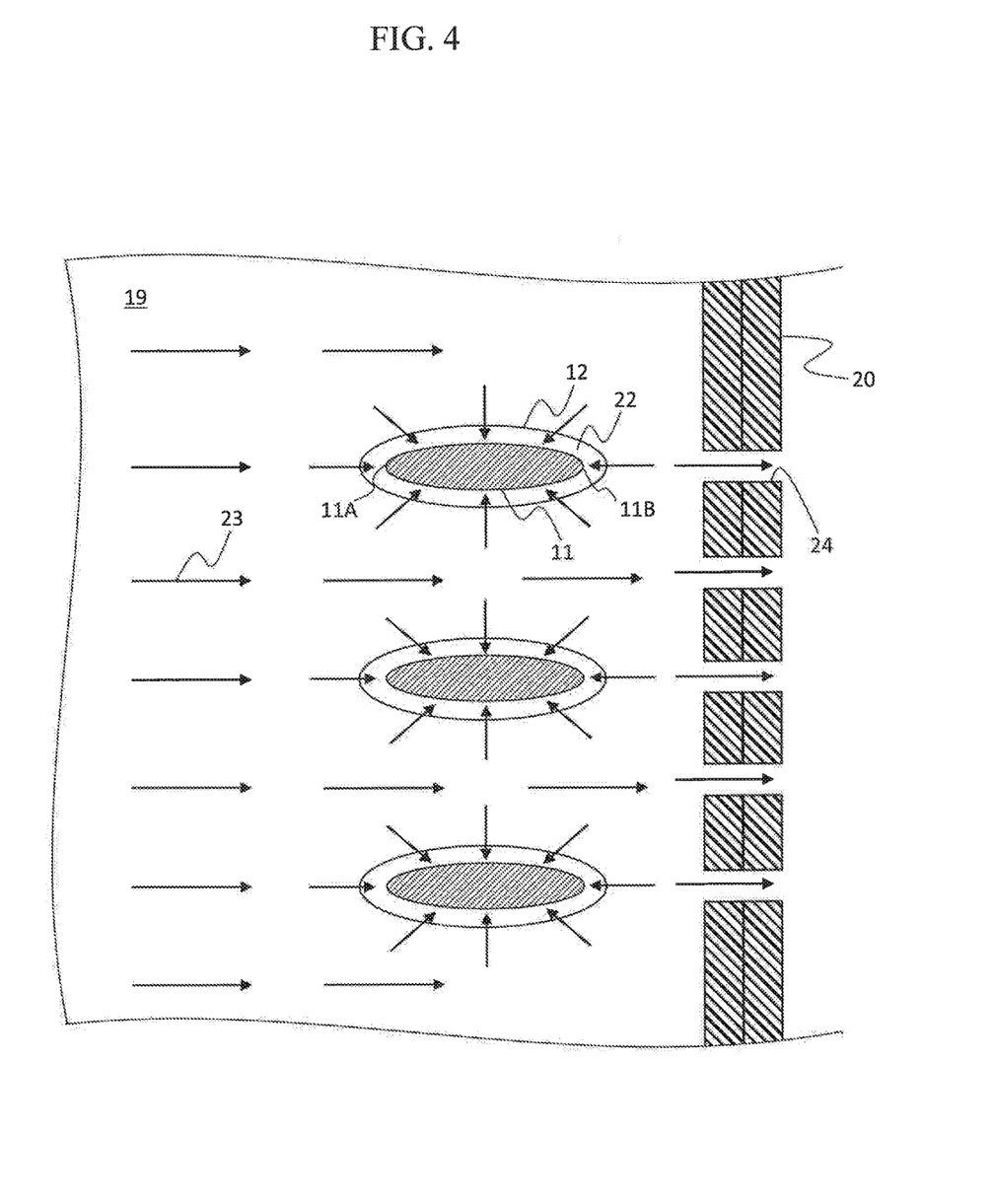
FIG. 4 is a sectional view in an arrow direction taken along line IV-IV of FIG. 2.

FIG. 4 is a sectional view in an arrow direction taken along line IV-IV of FIG. 2. As shown in FIG. 4, in this embodiment, the flange 20 for coupling the outer diffuser 10B and the downstream-side diffuser 13 together is provided with the communication holes 24 through which the outer cooling passage 19 communicates with the space outside of the downstream-side diffuser 13. The internal pressure inside the outer cooling passage 19 is higher as compared with the pressure in the space outside of the downstream-side diffuser 13; therefore, although the cooling air 23 reaching a downstream-side end portion of the outer cooling passage 19 is mostly intercepted by the flange 20 and flows out into the connection passages 22, part of the cooling air is sucked into the communication holes 24. By this, the flow of the cooling air 23 in the vicinity of downstream edges 11B of the struts 11 in the outer cooling passage 19 can be accelerated, so that the flow rate and flow velocity of the cooling air 23 passing along the outer going-around flow path and flowing into the connection passages 22 on the side of the downstream edges 11B of the struts 11 can be increased. In other words, the flow rate of the cooling air 23 flowing through the stagnation regions P shown in FIG. 6 relevant to the comparative example can be increased, whereby the cooling efficiency in the regions can be restrained from being lowered. Particularly, the stagnation regions in the outer cooling passage 19 are liable to be formed in the outer going-around flow path, namely, on the downstream side of the center lines X of the struts 11; therefore, disposition of the communication holes 24 on the downstream side of the center lines X of the struts 11 can be a countermeasure against the problem about the formation of the stagnation regions. Besides, with the positions of the communication holes 24 set on the downstream side of the downstream edges 11B of the struts 11, the flow rate of the cooling air 23 is increased, and the region in which the cooling air 23 is distributed is enlarged, whereby the stagnation regions can be reduced more. In addition, in this embodiment, since the communication holes 24 are provided also at positions between the adjacent struts 11, the stagnation of the cooling air 23 which is liable to be generated in the vicinity of inlets of the connection passages 22 on the side of the downstream edges 11B between the adjacent struts 11 can be effectively prevented.

(2) In the case where communication holes are not provided, as in the exhaust frame according to the comparative example, the exhaust frame 4 according to this embodiment can be obtained by additionally providing the flange G with communication holes. Thus, the exhaust frame 4 according to this embodiment can be easily obtained by applying a simple working to an existing exhaust frame.

(3) In this embodiment, by providing the communication holes 24 through which the outer cooling passage 19 communicates with the space outside of the downstream-side diffuser 13, it is possible to enhance the cooling efficiency for the exhaust frame 4. Therefore, maintainability of the exhaust frame 4 can be secured without using any highly heat-resistant material. Consequently, an increase in manufacturing cost can be suppressed, as compared to the case of manufacturing an exhaust frame by use of a valuable heat-resistant material.

(4) As a method for suppressing a rise in the temperature of an exhaust frame, there may be contemplated a method in which the flow rate of cooling air is increased or a method in which the number of struts is increased. According to the former method, however, in the case where an extracted portion of the high-pressure air produced at a compressor is used as a source of cooling air, the flow rate of the main flow gas is reduced, so that the gas turbine output is reduced and the efficiency is lowered. In the case where other element such as a blower is used as a cooling air supply source, also, the need to increase the blower capacity leads to an increase in cost. In addition, even if the flow rate of cooling air is increased, there still remains the tendency toward stagnation of cooling air in the vicinity of inlets of connection passages on the downstream side, and, therefore, it is difficult, by simply increasing the cooling air, to suppress the rise in the temperature of the exhaust frame. According to the latter method, by increasing the number of struts and thereby increasing the flow passage area of the connection passages, it is possible to lower the possibility of stagnation of cooling air and to suppress the rise in the temperature of the exhaust frame. However, the increase in the number of struts which interfere with the flow of the combustion gas flowing through the diffuser may lower the performance of the diffuser.

On the other hand, in this embodiment, a lowering in the cooling efficiency for the exhaust frame 4 is restrained by providing the flange 20 with the communication holes 24 sized in such a manner as not to influence the gas turbine efficiency, without increasing the flow rate of the cooling air or increasing the number of the struts. In this case, therefore, a lowering in the gas turbine efficiency can be obviated, and a rise in the cost can be suppressed. In addition, a lowering in the diffuser performance can also be avoided.

(5) In this embodiment, the communication holes 24 are formed to be closable. Therefore, in the case of such an environment that stagnation of the cooling air 23 inside the outer cooling passage 19 is not generated, for example, it is possible, by closing the communication holes 24, to restrain the cooling air 23 from being released to the space outside of the downstream-side diffuser 13.

<Second Embodiment>
(Configuration)

Figure 7:
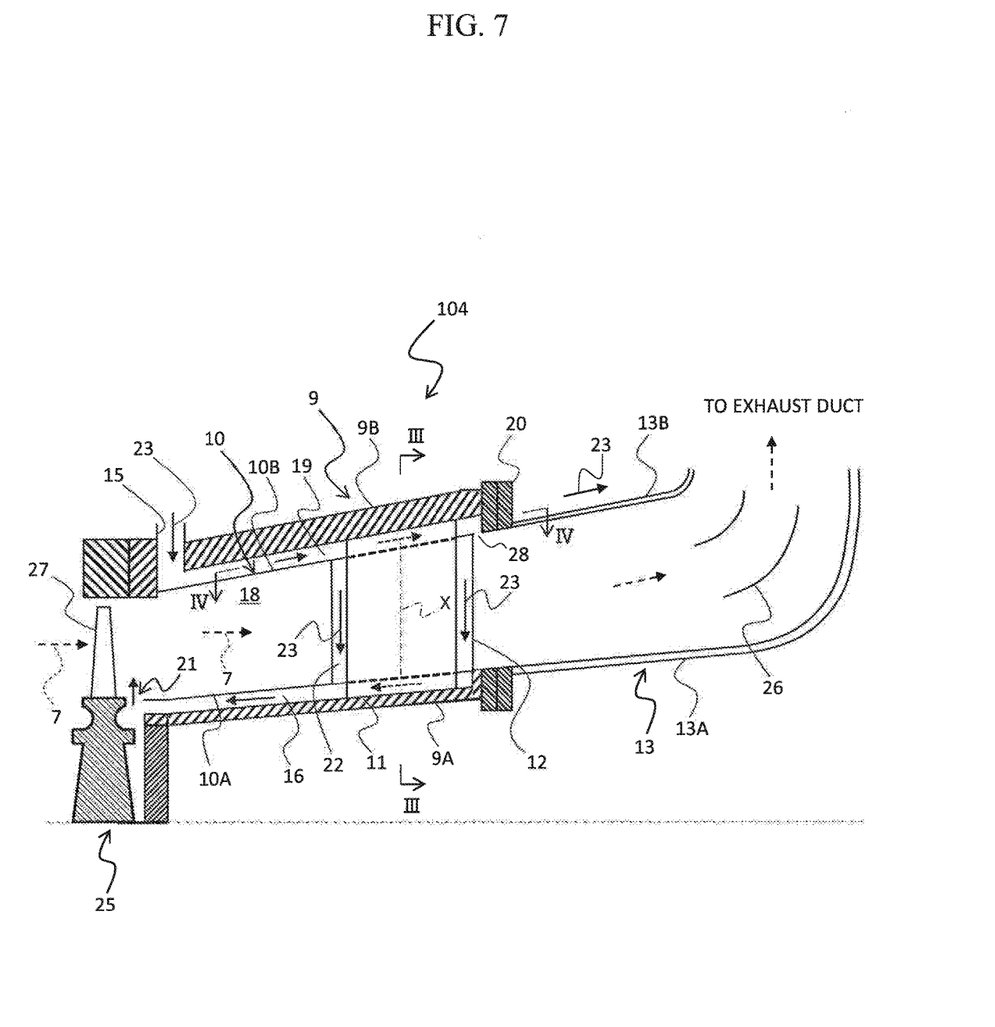
FIG. 7 is a schematic configuration view of an exhaust frame according to a second embodiment of the present invention.

FIG. 7 is a schematic configuration view of an exhaust frame according to a second embodiment. In FIG. 7, the equivalent parts to those in the first embodiment above are denoted by the same reference symbols as used above, and descriptions of them will be omitted appropriately.

An exhaust frame 104 according to this embodiment differs from the exhaust frame 4 of the first embodiment in the position of communication holes. In other points of configuration, the exhaust frame 104 in this embodiment is the same as the exhaust frame 4 in the first embodiment.

In this embodiment, communication holes 28 are provided in the outer diffuser 10B at positions on the downstream side of the center lines X, which extend in the radial directions of the turbine, of the struts 11 in the flow direction of the combustion gas 7 (in the example illustrated, on the downstream side of downstream edges of the struts 11), and the outer cooling passage 19 communicates with the exhaust passage 18 through the communication holes 28.

Since the cooling air 23 flowing through the outer cooling passage 19 has a pressure higher than the atmospheric pressure whereas the combustion gas 7 flowing through the exhaust passage 18 has a pressure lower than the atmospheric pressure, the internal pressure inside the outer cooling passage 19 is higher than the internal pressure inside the exhaust passage 18. Therefore, although the cooling air 23 having reached a downstream-side end portion of the outer cooling passage 19 mostly flows into the connection passages 22, part of the cooling air 23 is sucked into the communication holes 28 to join the combustion gas 7 flowing through the exhaust passage 18. As a result, the flow of the cooling air 23 in the vicinity of downstream edges of the struts 11 in the outer cooling passage 19 is accelerated, so that the flow rate and flow velocity of the cooling air 23 passing along the outer going-around flow path and flowing into the connection passages 22 are increased.

(Effects)

In this embodiment, the following effects can be obtained, in addition to the same effects as in the first embodiment.

In this embodiment, since the communication holes 28 are provided in the outer diffuser 10B, the cooling air 23 having flowed through the outer cooling passage 19 and having cooled the outer diffuser 10B can be led into the exhaust passage 18, instead of into the space outside of the downstream-side diffuser 13. Therefore, the quantity of heat released to the external space from the gas turbine 100 (a diffusing heat quantity) can be decreased.

Besides, in this embodiment, since the communication holes 28 are provided in the outer diffuser 10B which is thinner than the flange 20, the communication holes can be provided more easily than in the first embodiment.

<Third Embodiment>
(Configuration)

Figure 8:
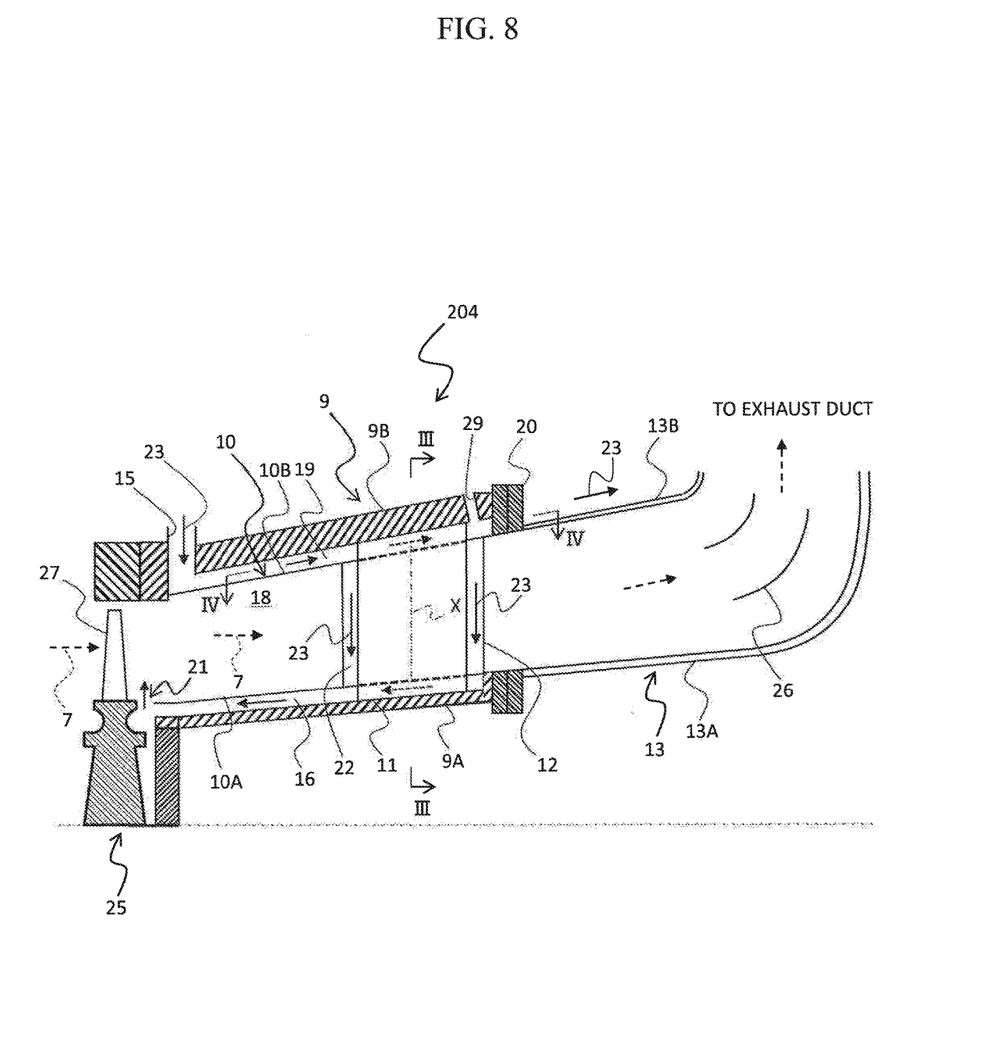
FIG. 8 is a schematic configuration view of an exhaust frame according to a third embodiment of the present invention.

FIG. 8 is a schematic configuration view of an exhaust frame according to a third embodiment. In FIG. 8, the equivalent parts to those in the first embodiment above are denoted by the same reference symbols as used above, and descriptions of them will be omitted appropriately.

An exhaust frame 204 according to this embodiment differs from the exhaust frame 4 of the first embodiment in the position of communication holes. In other points of configuration, the exhaust frame 204 in this embodiment is the same as the exhaust frame 4 in the first embodiment.

In this embodiment, communication holes 29 are provided in the outer casing 9B at positions on the downstream side of the center lines X, which extend in the radial directions of the turbine, of the struts 11 in the flow direction of the combustion gas 7, and the outer cooling passage 19 communicates with the space outside of the outer casing 9B through the outer casing 9B.

Since the cooling air 23 flowing through the outer cooling passage 19 has a pressure higher than the atmospheric pressure whereas the air pressure in the space outside of the outer casing 9B is the atmospheric pressure, the internal pressure inside the outer cooling passage 19 is higher than the air pressure in the space outside of the outer casing 9B. Therefore, although the cooling air 23 having reached a downstream-side end portion of the outer cooling passage 19 mostly flows into the connection passages 22, part of the cooling air 23 is sucked into the communication holes 29. As a result, the flow of the cooling air 23 in the vicinity of downstream edges of the struts 11 in the outer cooling passage 19 is accelerated, so that the flow rate and flow velocity of the cooling air 23 passing along the outer going-around flow path and flowing into the connection passages 22 are increased.

(Effects)

Even in the case where the communication holes 29 are provided in the outer casing 9B, as in this embodiment, the same effects as in the first embodiment can be obtained.

<Others>

The present invention is not limited to the above-described embodiments, and includes various modifications. For instance, the above embodiments have been described in detail for easily understandable explanation of the present invention, and are not necessarily restricted to those having all the configurations described. For instance, part of the configurations of an embodiment may be replaced by a configuration of another embodiment, or part of the configurations of each embodiment may be omitted.

In each of the embodiments described above, a configuration wherein a plurality of communication holes 24 are arranged in the circumferential direction has been shown by way of example. However, the essential effect of the present invention is to restrain the cooling efficiency for the exhaust frame from being lowered, and the aforementioned configuration is not limitative, so long as this essential effect can be obtained. For instance, a configuration may be adopted wherein only one communication hole 24 is arranged in the circumferential direction.

What is claimed is:

1. An exhaust frame connected to an outlet for a combustion gas of a turbine, the exhaust frame comprising:
an inner casing;
an inner diffuser wall that covers an outer side of the inner casing and defines, between the inner diffuser wall and the inner casing, an annular inner cooling passage connected to a final-stage wheel space of the turbine;
an outer diffuser wall that covers an outer side of the inner diffuser wall and defines an exhaust passage for the combustion gas between the outer diffuser wall and the inner diffuser wall;
a downstream-side diffuser connected to the outer diffuser wall at a downstream end of the outer diffuser wall relative to a flow of the combustion gas;
an outer casing that covers an outer side of the outer diffuser wall and defines an annular outer cooling passage between the outer casing and the outer diffuser wall, an end portion of the outer cooling passage being closed with a flange that connects the outer diffuser wall and the downstream-side diffuser;
a strut that connects the inner casing and the outer casing to each other, wherein the strut crosses the exhaust passage;
a strut cover that connects the inner diffuser wall and the outer diffuser wall to each other, covers the strut, and defines, between the strut cover and the strut, an annular connection passage connecting the inner cooling passage and the outer cooling passage to each other; and
a communication hole that penetrates the flange at a position downstream of a center line of the strut, relative to the flow direction of the combustion gas, wherein
the outer cooling passage is provided with a cooling air introduction hole at a position upstream of the connection passage relative to the flow of the combustion gas,
a flow pathway is formed such that cooling air introduced into the outer cooling passage from the cooling air introduction hole passes through the connection passage and flows down to the final-stage wheel space from an outlet of the inner cooling passage, and
the communication hole is configured to allow part of the cooling air in the outer cooling passage flowing from the cooling air introduction hole toward an inlet of the connection passage to flow out to a space outside of the downstream-side diffuser from the outer cooling passage.

2. The exhaust frame according to claim 1, wherein the communication hole is provided at a position that is downstream of a downstream edge of the strut.

3. The exhaust frame according to claim 1, wherein the strut is one of a plurality of struts that are provided along the circumferential direction of the inner casing, the communication hole is one of a plurality of communication holes, and at least one of the communication holes is provided between each pair of adjacent struts of the plurality of struts.

4. The exhaust frame according to claim 1, wherein the communication hole is formed in a closable manner.

* * * * *